United States Patent
Park et al.

(10) Patent No.: US 8,983,695 B2
(45) Date of Patent: Mar. 17, 2015

(54) ELECTRIC VEHICLE AND METHOD FOR CONTROLLING SAME

(75) Inventors: Chang Hwan Park, Seoul (KR); Byoung Sun Jeon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 58 days.

(21) Appl. No.: 13/813,626

(22) PCT Filed: Aug. 1, 2011

(86) PCT No.: PCT/KR2011/005641
§ 371 (c)(1),
(2), (4) Date: Jan. 31, 2013

(87) PCT Pub. No.: WO2012/018203
PCT Pub. Date: Feb. 9, 2012

(65) Prior Publication Data
US 2013/0131904 A1    May 23, 2013

(30) Foreign Application Priority Data

Aug. 2, 2010 (KR) .................. 10-2010-0074745
Apr. 7, 2011 (KR) .................. 10-2011-0032219
Apr. 7, 2011 (KR) .................. 10-2011-0032220

(51) Int. Cl.
| | | |
|---|---|---|
| *B60L 15/20* | (2006.01) | |
| *B60L 3/00* | (2006.01) | |
| *B60L 11/18* | (2006.01) | |

(52) U.S. Cl.
CPC ............. *B60L 15/20* (2013.01); *B60L 3/0084* (2013.01); *B60L 2240/423* (2013.01); *Y02T 10/642* (2013.01); *B60L 3/0061* (2013.01); *B60L 11/1803* (2013.01); *B60L 2210/10* (2013.01); *B60L 2240/12* (2013.01); *B60L 2240/429* (2013.01); *B60L 2240/461* (2013.01); *B60L 2240/549* (2013.01); *B60L 2240/642* (2013.01); *B60L 2250/16* (2013.01); *Y02T 10/7005* (2013.01); *Y02T 90/16* (2013.01); *Y02T 10/7216* (2013.01); *Y10S 903/902* (2013.01); *Y10S 903/906* (2013.01)
USPC ............. 701/22; 180/65.1; 903/902; 903/906

(58) Field of Classification Search
USPC ........ 701/22; 180/65.1, 65.285; 903/902, 906
See application file for complete search history.

(56) References Cited

U.S. PATENT DOCUMENTS

| | | | |
|---|---|---|---|
| 2005/0050965 A1 | 3/2005 | Zaremba et al. | |
| 2007/0138986 A1* | 6/2007 | Kutsuna et al. | ............... 318/254 |

FOREIGN PATENT DOCUMENTS

| | | |
|---|---|---|
| CN | 101430560 A | 5/2009 |
| DE | 102008014495 A1 | 9/2009 |

(Continued)

OTHER PUBLICATIONS

International Search Report from corresponding PCT application No. PCT/KR2011/005641.

*Primary Examiner* — Mary Cheung
*Assistant Examiner* — Brian P Sweeney
(74) *Attorney, Agent, or Firm* — McKenna Long & Aldridge LLP (57) ABSTRACT

The present invention relates to an electric vehicle and to a method for controlling same. The method for controlling the electric vehicle according to the present invention comprises the steps of: using first data to calculate a first torque value in a first memory; using second data to calculate a second torque value in a second memory having a memory address separate from the first memory; and comparing the first torque value and the second torque value, determining whether an abnormality exists in the torque calculations, and controlling the motion of the vehicle.

16 Claims, 8 Drawing Sheets

(56) References Cited

FOREIGN PATENT DOCUMENTS

| JP | 08-242505 A | 9/1996 |
| JP | 09-247801 A | 9/1997 |
| JP | 10-023601 A | 1/1998 |
| JP | H10-23601 | 1/1998 |
| JP | 2000-287484 A | 10/2000 |
| KR | 10-2003-0046627 A | 6/2003 |
| KR | 10-2009-0100580 A | 9/2009 |

* cited by examiner

ELECTRIC VEHICLE AND METHOD FOR CONTROLLING SAME

TECHNICAL FIELD

The present invention relates to an electric vehicle and a method for controlling the same, and more particularly to an electric vehicle which determines the presence or absence of a malfunction in a memory region storing data therein using a plurality of controllers or detects the presence or absence of an operation error of the controllers so as to control vehicle traveling on the basis of the determined result, detects an error encountered in a motor control unit (MCU) using a main controller (vehicle control module: VCM), controls vehicle traveling by detecting a vehicle state, calculates torque values encountered in different memory regions of the MCU, and controls vehicle traveling, and to a method for controlling the same.

BACKGROUND ART

Electric vehicles (EVs) have been actively studied because they are the most promising solution to pollution and energy problems.

Electric vehicles (EVs) are mainly powered by an AC or DC motor using power of a battery. The electric vehicles are broadly classified into battery powered electric vehicles and hybrid electric vehicles. In the battery powered electric vehicles, a motor is driven using power of a battery, and the battery is recharged after stored power is consumed. In hybrid electric vehicles, a battery is charged with electricity generated via engine driving, and an electric motor is driven using the electricity to realize vehicle movement.

The hybrid electric vehicles may further be classified into serial and parallel types. In the case of serial hybrid electric vehicles, mechanical energy output from an engine is changed into electric energy via a generator, and the electric energy is fed to a battery or motor. Thus, the serial hybrid electric vehicles are always driven by a motor similar to conventional electric vehicles, but an engine and generator are added for the purpose of increasing range. Parallel hybrid electric vehicles may be driven using two power sources, i.e. a battery and an engine (gasoline or diesel). Also, the parallel hybrid electric vehicles may be driven using both the engine and the motor according to traveling conditions.

With recent gradual development of motor/control technologies, small high-output and high-efficiency systems have been developed. Owing to replacing a DC motor by an AC motor, electric vehicles have accomplished considerably enhanced output and power performance (acceleration performance and maximum speed) comparable to those of gasoline vehicles. As a result of promoting a higher output and higher revolutions per minute, a motor has achieved reduction in weight and size, and consequently reduction in the weight and size of a vehicle provided with the motor.

The electric vehicle includes a central controller for controlling a variety of functions. Assuming that only one controller is used, it is very difficult to detect abnormality of a non-volatile memory and abnormality of torque operation. In addition, assuming that abnormality or malfunction occurs in the MCU configured to control a motor upon receiving a command from the central controller, the motor may be wrongly driven in a different way from the command generated by the controller.

DISCLOSURE

Technical Problem

Therefore, the present invention has been made in view of the above problems, and an object of the present invention is to provide an electric vehicle including a plurality of controllers and a motor control unit (MCU), which can allow the plurality of controllers to control vehicle traveling by monitoring data of a non-volatile memory and calculated torque values, can control vehicle traveling by monitoring torque values calculated by the controllers and the MCU, or can also control vehicle traveling by monitoring torque values calculated in a plurality of memory regions of the MCU, and a method for controlling the same.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

In accordance with one aspect of the present invention, the above and other objects can be accomplished by a method for controlling an electric vehicle including: calculating a first torque value using first data by a first memory; calculating a second torque value using second data by a second memory having a memory address different from that of the first memory; and determining the presence or absence of abnormality in torque calculation by comparing the first torque value with the second torque value.

In accordance with another aspect of the present invention, an electric vehicle includes: a motor control unit (MCU) for calculating a torque value upon receiving an input value for torque calculation; and a motor for generating torque corresponding to a torque value calculated by the motor control unit (MCU), wherein the motor control unit (MCU) includes: a first memory having a specific memory address; and a second memory having a specific memory address different from that of the first memory, whereby the motor control unit (MCU) receives the input value and calculates a first torque value at the first memory and a second torque value at the second memory, and the motor generates torque using the first torque value or the second torque value as a final torque value when the first torque value is identical to the second torque value.

In accordance with another aspect of the present invention, an electric vehicle includes: a vehicle control module (VCM) for generating a torque command to control vehicle driving; and a motor control unit (MCU) for calculating a first torque value in response to the torque command and controlling a motor on the basis of the calculated first torque value, and feeding back raw data regarding the first and second torque values to the vehicle control module (VCM), wherein the vehicle control module (VCM) calculates a second torque value using the raw data, and determines a current vehicle state by comparing the torque command with the first and second torque values.

In accordance with another aspect of the present invention, an electric vehicle includes: a first memory for storing data; a second memory for storing data; a first controller for storing data of the vehicle in the first memory, determining the presence or absence of abnormality in the data stored in the first memory and the second memory, and calculating a first torque value for controlling the vehicle; and a second controller for storing data of the vehicle in the second memory independently from the first controller, determining the presence or absence of abnormality in the data stored in the first memory and the second memory, and calculating a second torque value for controlling the vehicle, wherein the first controller and the second controller compare the first torque value with the second torque value to determine the presence or absence of abnormality in torque calculation, and control vehicle driving according to the presence or absence of abnormal torque calculation or abnormal data.

Advantageous Effects

In accordance with the embodiments of the present invention, an electric vehicle and a method for controlling the same have the following advantages. The electric vehicle includes a plurality of controllers to monitor a non-volatile memory, determines the presence or absence of abnormal data in a non-volatile memory while simultaneously correcting the abnormal data, and performs mutual monitoring of torque values calculated by a plurality of controllers, such that it can control torque values using one or more controllers having no errors.

The electric vehicle monitors torque values calculated by the controller and the motor control unit (MCU), such that unexpected problems such as erroneous operation of the MCU occur. As a result, although unexpected errors occur in torque values actually applied to the motor whereas the calculated torque value is correctly output, the electric vehicle can recognize the errors.

The electric vehicle monitors torque values calculated in different memory regions of the motor control unit (MCU), such that it can recognize calculation errors of torque values of the MCU.

As a result, reliability of torque values of the motor can be increased, such that the electric vehicle properly copes with unexpected situations such as sudden unintended acceleration by preventing sudden change of torque, and prevents sudden stop of the running vehicle or a control disabled state thereof, resulting in a guarantee of the safety of the electric vehicle.

DESCRIPTION OF DRAWINGS

The above and other objects, features and other advantages of the present invention will be more clearly understood from the following detailed description taken in conjunction with the accompanying drawings.

BEST MODE

Advantages and features of the present invention and a method of achieving the advantages and features of the present invention will be clearly understood from embodiments described hereinafter in conjunction with the accompanying drawings. However, the present invention is not limited to the following embodiments and may be realized in various different forms. These embodiments are provided only to completely disclose the present invention and for a person having ordinary skill in the art to which the present invention pertains to completely understand the category of the invention. That is, the present invention is defined only by the category of the claims. The same reference numbers will be used throughout this specification to refer to the same parts.

Embodiments of the present invention will be described below with reference to the attached drawings. The electric vehicle and a method for controlling the same according to embodiments of the present invention will hereinafter be described with reference to the attached drawings.

Figure 1:
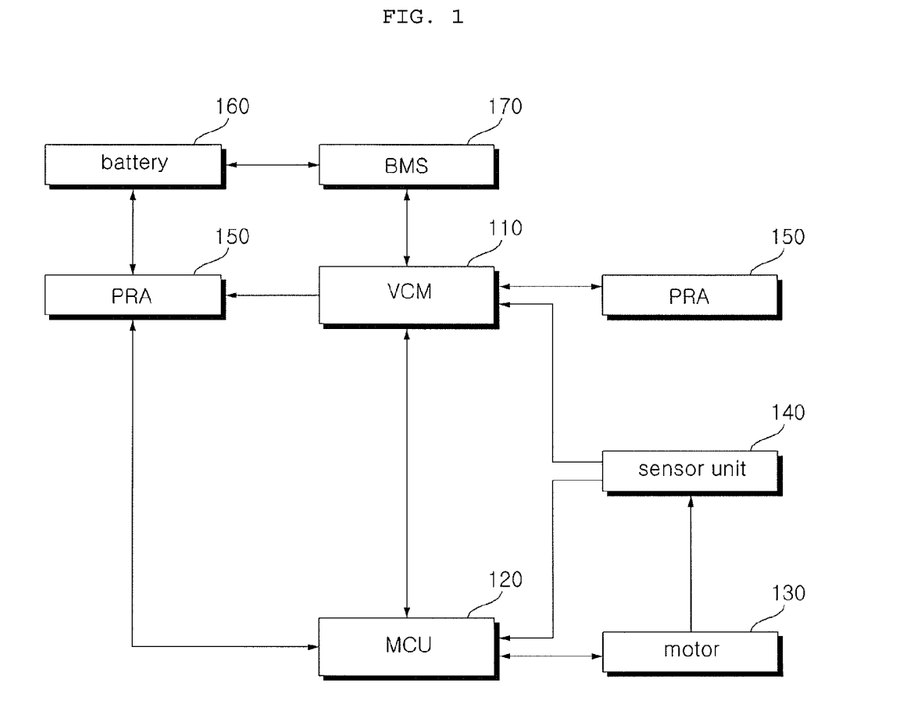
FIG. 1 is a block diagram illustrating constituent components of an electric vehicle according to an embodiment of the present invention.

FIG. 1 is a block diagram illustrating constituent components of an electric vehicle according to an embodiment of the present invention.

Referring to FIG. 1, the electric vehicle includes a vehicle control module (VCM) 110, a motor control unit (MCU) 120, a motor 130, a sensor unit 140, a power relay assembly (PRA) 150, a battery 160, a battery management system 170, and an interface unit 180.

The electric vehicle includes the battery 160, operates using power charged in the battery 160, and charges the battery 160 upon receiving power from a charging station, a vehicle charging installation, a home or an external part.

The battery 160 includes a plurality of high-voltage battery cells. In this case, the electric vehicle further includes a battery management system (BMS) 170. The BMS 170 controls a charging operation of the battery 160, determines the remaining battery capacity and the presence or absence of charging necessity, and performs a management operation for providing the charging current stored in the battery 160 to each part of the electric vehicle.

When charging and using the battery, the BMS 170 maintains a regular voltage difference between cells of the battery 160, and controls the battery not to be overcharged or over-discharged, resulting in increased battery lifespan.

The BMS 170 measures the remaining battery lifespan of the battery 160 and a voltage of the battery 160, and outputs the measured result to the VCM 110.

A Power Relay Assembly (PRA) 150 includes a plurality of relays and a sensor to perform switching of a high voltage, so that it receives an operating power of a high voltage from the battery 160, and applies the received power to the MCU 120 or prevents the received power from being applied to the MCU 120. In this case, the PRA 150 operates the relays upon receiving a control command from the VCM 110.

When the vehicle starts or stops driving, the PRA 150 switches a plurality of relays according to a predetermined order upon receiving a control command from the VCM 110, such that the operating power of a high voltage stored in the battery 160 can be applied to individual parts of the vehicle.

The PRA 150 prevents battery power from being applied to the MCU 120, and also prevents power from being applied to the motor 130, such that the motor 130 stops operation and thus the vehicle also stops driving.

The MCU 120 generates a control signal for driving at least one motor 130 connected thereto, generates a predetermined signal for controlling the motor 130, and applies the generated signal to the motor 130. In this case, the MCU 120 includes an inverter (not shown) and a converter (not shown), so that it can control the motor 130 by controlling the inverter or converter.

The MCU 120 calculates a torque value on the basis of various input values, and the motor 130 generates a torque on the basis of the calculated torque value.

The MCU 130 calculates a torque value upon receiving a torque command from the MCU 110, and drives the motor 130 in response to a torque command using battery power received through the PRA 150.

The VCM 110 controls vehicle traveling and overall operations of the electric vehicle. The VCM 110 generates and outputs a predetermined command to the MCU 120 in such a manner that predetermined operations corresponding to input data of the interface unit 180 and the sensor unit 140 are carried out, such that input/output (I/O) of data is controlled.

The VCM 110 outputs a torque command for driving the motor 130 to the MCU 120, and monitors the presence or absence of an operation error in the MCU 120.

The sensor unit 140 detects signals generated when the vehicle runs or performs a predetermined operation, and inputs the detected signals to the VCM 110. The sensor unit 140 includes a plurality of sensors inside or outside of the vehicle so that it can detect a variety of signals. In this case, different types of sensors may be used according to installation positions. The sensor unit 140 includes a wheel sensor for sensing a wheel speed to calculate a torque value, and a slope sensor for sensing a slope of the vehicle.

The sensor unit 140 includes a plurality of sensors, and measures an input current of the motor 130 and a rotor angle of the motor 130, such that it can transmit the measured values to the MCU 120.

The interface unit 180 includes an input unit configured to input a predetermined signal by a vehicle driver's manipulation, and an output unit for outputting current operation state information of the electric vehicle.

The input unit may include manipulators such as a steering wheel, an accelerator, a brake, etc. The accelerator outputs acceleration information for calculating a torque value, and the brake outputs brake information for calculating a torque value.

The input unit includes a plurality of switches and a plurality of buttons to operate a turn signal, a tail lamp, a head lamp, brushes, etc.

The output unit includes a display for displaying information, a speaker for outputting music, sound effects, and warning sounds, and various state indicator lamps, etc.

Figure 2:
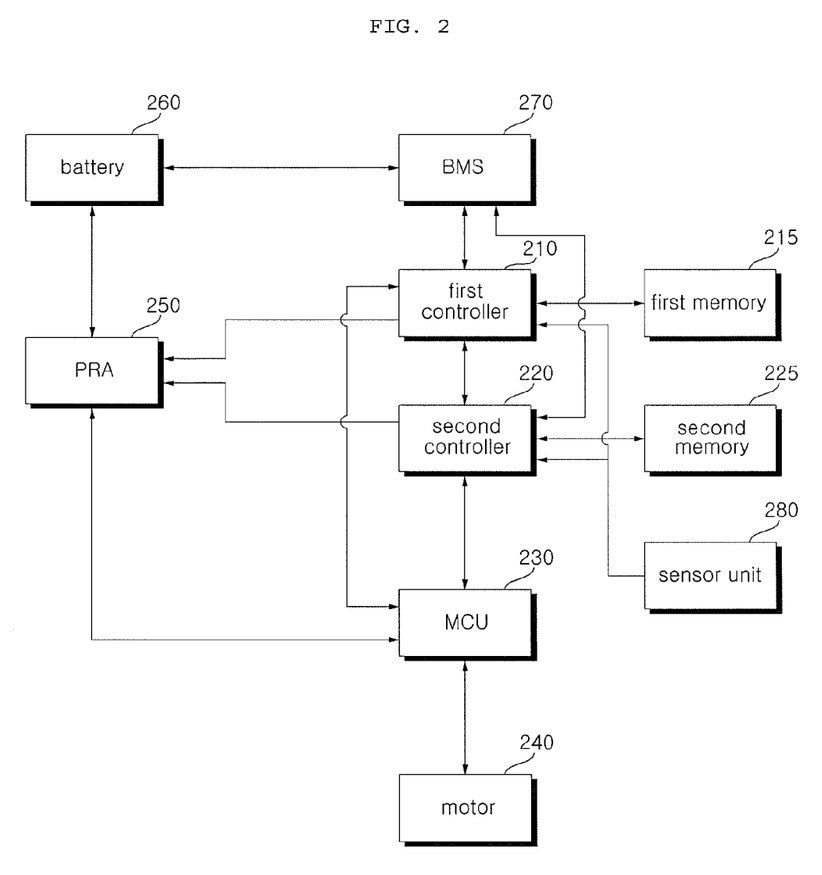
FIG. 2 is a block diagram illustrating constituent components of an electric vehicle according to an embodiment of the present invention.

FIG. 2 is a block diagram illustrating constituent components of an electric vehicle according to an embodiment of the present invention.

Referring to FIG. 2, the electric vehicle includes a first controller 210, a second controller 220, a first memory 215, a second memory 225, a motor control unit (MCU) 230, a motor 240, a power relay assembly (PRA) 250, a battery 260, a battery management system (BMS) 270, and a sensor unit 280. Compared to the electric vehicle of FIG. 1, the electric vehicle shown in FIG. 2 includes a plurality of vehicle control modules (VCMs).

The same elements as those of FIG. 1, i.e., the motor 240, the PRA 250, the battery 260, and the BMS 270, will herein be omitted for convenience of description and better understanding of the present invention.

Each of the first memory 215 and the second memory 225 stores data of the electric vehicle. Data of the first memory 215 is identical to that of the second memory 225. However, assuming that error or noise occurs in a signal transmission step, the first memory 215 and the second memory 225 may have different data. Each of the first memory 215 and the second memory 225 is any of non-volatile memories, for example, ROM, hard disc, flash memory, EEPROM, etc.

The first controller 210 stores data related to vehicle traveling in the first memory 215. Data related to vehicle travelling is stored in the second memory 225 independently from the first controller 210. The first controller 210 determines the presence or absence of a malfunction in data stored in a non-volatile memory. If a malfunction occurs in the stored data, the first controller 210 corrects abnormal data, and calculates a first torque value using data stored in the first memory 215.

The second controller 220 determines the presence or absence of a malfunction in data stored in the first memory 215 and the second memory 225. If a malfunction occurs in the stored data, the second controller corrects abnormal data, and calculates a second torque value using data stored in the second memory 225.

The first controller 210 compares a first torque value with a second torque value received from the second controller 220, determines the presence or absence of a malfunction in the torque value, and transmits a control command to the MCU 230, the PRA 250, and the BMS 270 so as to control vehicle traveling.

The second controller 220 compares a second torque value with a first torque value received from the first controller 210, determines the presence or absence of a malfunction in the torque value, and transmits a control command to the MCU 230, the PRA 250, and the BMS 270 so as to control vehicle traveling.

The MCU 230 is operated in response to a control command from either the first controller 210 or the second controller 220.

The sensor unit 280 detects signals generated when the vehicle runs or performs a predetermined operation, and inputs the detected signals to the first controller 210 and the second controller 220. The sensor unit 280 includes a plurality of sensors inside or outside of the vehicle so that it can detect a variety of signals. In this case, different types of sensors may be used according to installation positions.

The sensor unit 280 may include an accelerator position sensor (APS), a brake position sensor (BPS), a vehicle speed sensor, etc. The APS is a sensor indicating an acceleration state, and the BPS is a sensor indicating the degree of stepped-on brake. The vehicle speed sensor is a sensor for measuring the speed of vehicle FIG. 3 is a diagram illustrating a motor control unit (MCU) of the electric vehicle according to an embodiment of the present invention.

Figure 3:
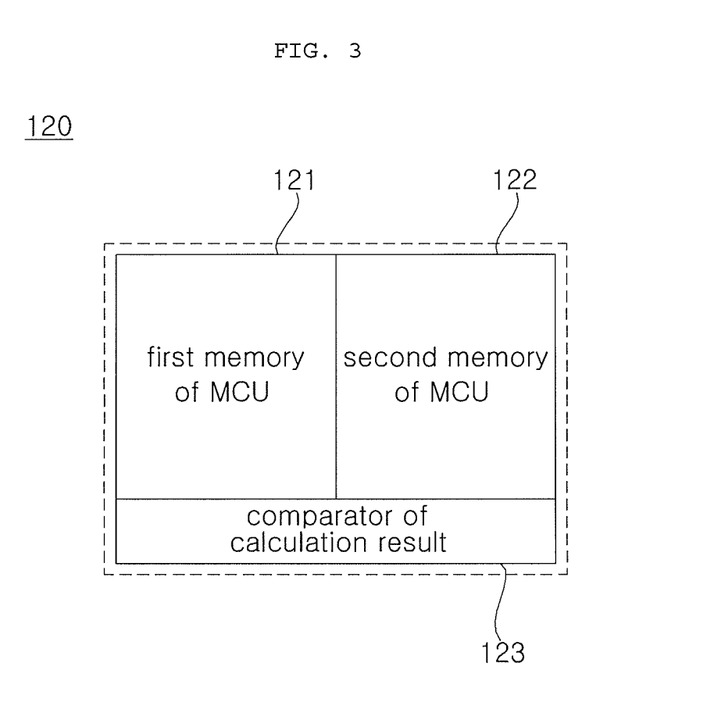
FIG. 3 is a diagram illustrating a motor control unit (MCU) of the electric vehicle according to an embodiment of the present invention.

Referring to FIG. 3, the MCU 120 of the electric vehicle includes a first memory 121 for calculating a first torque value, a second memory 122 for calculating a second torque value, and a comparator 124 for determining whether the first torque value is identical to the second torque value.

The first memory 121 and the second memory 122 are used as memory regions having different memory addresses. The first memory 121 and the second memory 122 calculate a first torque value and a second torque value using the same input values and the same logic units at the same time. Torque values of the first memory 121 and the second memory 122 may be simultaneously calculated by performance of the processor, or may be calculated at intervals of a predetermined time. Although torque values of the first memory 121 and the second memory 122 are calculated at intervals of a predetermined time, the first memory 121 and the second memory 122 are calculated using the same input values at the same time.

Input values needed for calculating torque values in the first memory 121 and the second memory 122 may be acceleration information of an accelerator of the interface unit 180, braking information, and a wheel speed sensed by the wheel sensor of the sensor unit 140. In addition, the input values may further include the remaining battery lifespan and the battery voltage measured by the BMS 170, a vehicle slope detected by the slope sensor of the sensor unit 140, and a torque control value for performing an economy (ECO) mode or an electronic stability control (ESC).

The comparator 123 compares a first torque value obtained from the first memory 121 with a second torque value obtained from the second memory 122. If the first and second torque values are identical to each other, the comparator 123 outputs the final torque value. If the first and second torque values are different from each other, the comparator 123 outputs a signal indicating a calculation error.

If the comparator 123 outputs a torque value, the PRA 150 and the motor 130 are controlled in a manner that the motor 130 can output the final torque value. If the comparator 123 outputs the calculation error signal, the output unit of the interface unit 180 outputs the calculation error signal to the outside, and the motor 130 does not generate the first torque value and the second torque value.

Figure 4:
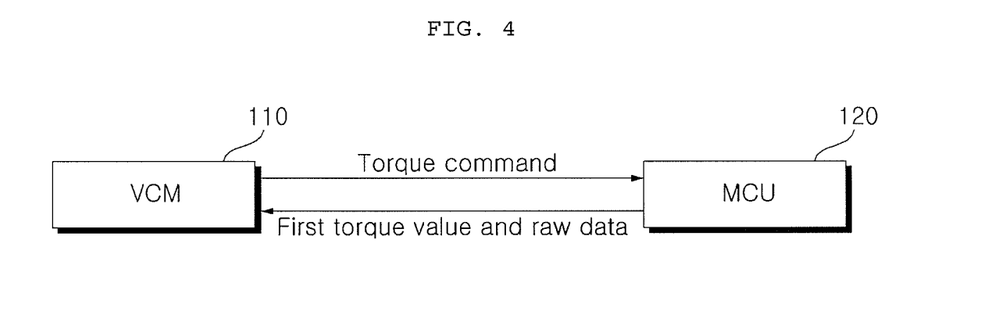
FIG. 4 is a conceptual diagram illustrating a vehicle control method for monitoring the electric vehicle according to an embodiment of the present invention.

FIG. 4 is a conceptual diagram illustrating a vehicle control method for monitoring the electric vehicle according to an embodiment of the present invention.

Referring to FIG. 4, the VCM 110 outputs a torque command for driving the motor 130 to the MCU 120. In response to the torque command, the MCU 130 feeds back not only the first torque value calculated on the basis of the torque command but also raw data related to the first torque value to the VCM 110.

The raw data may include a U-phase current value, a V-phase current value, and a W-phase current value to be input to the motor 130. The raw data may further include a torque ID, a rotor angle of the motor 130, a rated torque of the motor 130, and a current at the rated torque of the motor 130.

The VCM 110 calculates a second torque value using the raw data, such that the MCU 120 can monitor whether a torque value actually applied to the motor 130 has a malfunction in response to the torque command.

The VCM 110 performs comparison among the torque command applied to the MCU 120, the first torque value received from the MCU 120, and the second torque value calculated using the raw data, such that it recognizes a vehicle state and controls vehicle traveling.

Figure 5:
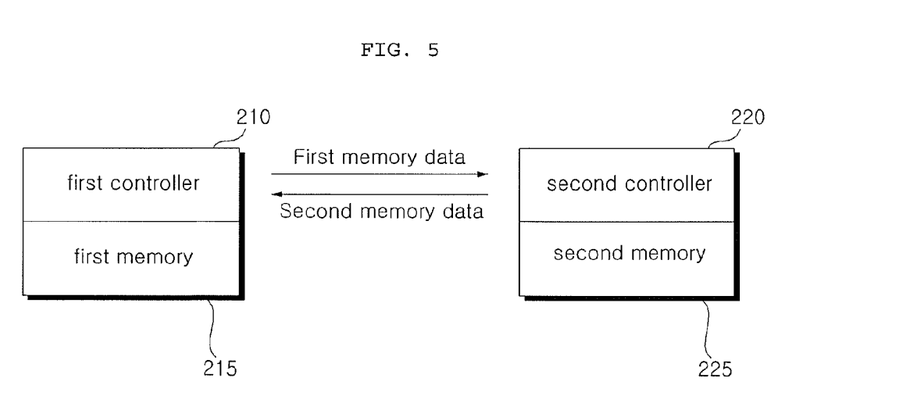
FIG. 5 is a conceptual diagram illustrating mutual monitoring using a plurality of controllers according to an embodiment of the present invention.

FIG. 5 is a conceptual diagram illustrating mutual monitoring using a plurality of controllers according to an embodiment of the present invention.

Referring to FIG. 5, the first controller 210 determines the presence or absence of an error in data stored in the first memory 215 and the second memory 225. If the error occurs in the stored data, the first controller 210 corrects abnormal data.

The second controller 220 determines the presence or absence of an error in data stored in the first memory 215 and the second memory 225. If the error occurs in the stored data, the second controller 220 corrects abnormal data.

The first controller 210 transmits data stored in the first memory 215 to the second memory 225, and the second controller 220 transmits data stored in the second memory 225 to the first memory 215.

TABLE 1

| Address | Data of Memory | Equal to or different from Predefined checksum | Normal or abnormal state |
|---|---|---|---|
| 1 | Data1 | Agreement | Normal |
| 2 | Data2 | Agreement | Normal |
| 3 | Data3 | Disagreement | Normal |
| 4 | Data4 | Agreement | Normal |
| ... | ... | ... | ... |

Table 1 shows a process for allowing a plurality of controllers to determine whether a malfunction or error occurs in data stored in a plurality of memories.

Referring to Table 1, if a checksum value prestored in the first controller 210 is identical to a checksum value calculated using the data stored in the first memory 215, the first controller 210 determines a normal state. If the two checksum values are different from each other, the first controller 210 determines an abnormal state. If the abnormal state has occurred, abnormal data can be corrected using previous data and the next data of the abnormal data.

In this case, a linear interpolation method may be used as a data correction method. The abnormal data can be corrected using an average value of the previous data and the next data of the abnormal data.

The first controller 210 receives data stored in the second memory 225 from the second controller 220, and determines whether a malfunction (or abnormality) occurs in data stored in the second memory 225 using the same method as described above. If a malfunction occurs in data stored in the second memory 225, the first controller 210 can correct the abnormal data.

After the second controller 220 receives data stored in the first memory 215 from the first controller 210, and receives data stored in the second memory 225, it determines whether abnormality occurs in the data stored in the first memory 215. If the abnormality occurs in the stored data, the second controller 220 can correct the abnormal data.

The first controller 210 and the second controller 220 detects how many times such abnormality occurs in the first memory 215 and the second memory 225, and store the detected number of times.

Figure 6:
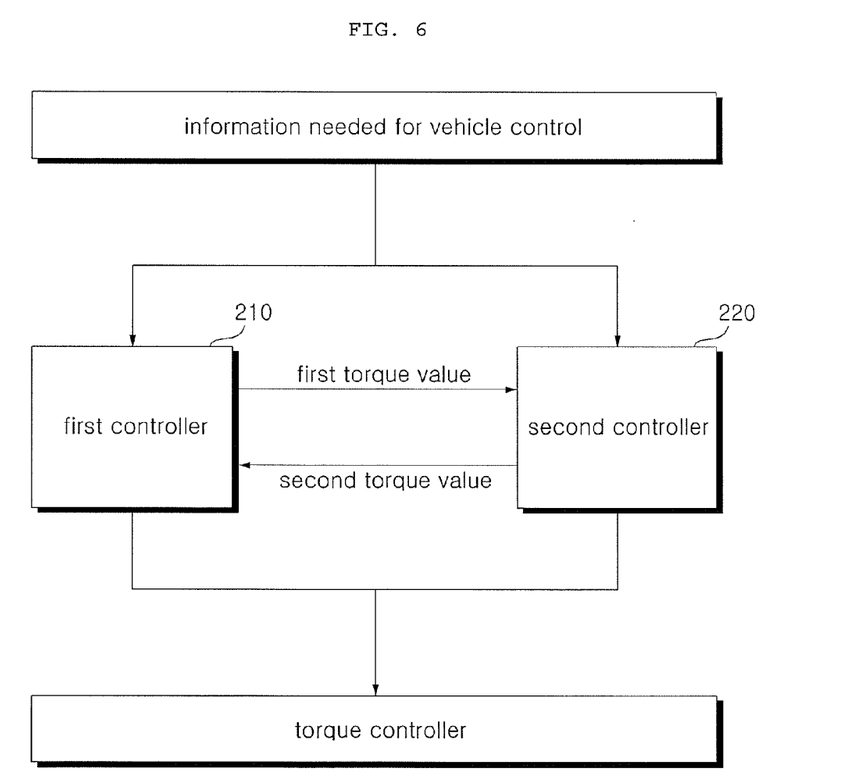
FIG. 6 is a conceptual diagram illustrating a method for controlling the electric vehicle through mutual monitoring of the first controller and the second controller according to an embodiment of the present invention.

FIG. 6 is a conceptual diagram illustrating a method for controlling the electric vehicle through mutual monitoring of the first controller 210 and the second controller 220 according to an embodiment of the present invention.

Referring to FIG. 6, the electric vehicle receives information needed for vehicle control from the sensor unit 140, and the first controller 210 stores the received information in the first memory 215, and the second controller 220 stores the received information in the second memory 225. Input data from the sensor unit 270 may include an accelerator, a brake, a vehicle speed, etc.

The first controller 270 calculates a first torque value using data stored in the first memory 215, and the second controller 220 calculates a second torque using data stored in the second memory 225.

The first controller 210 and the second controller 220 perform mutual transmission of the first torque value and the second torque value, compare a checksum of the first torque value with a checksum of the second torque value for a predetermined time so as to determine the presence or absence of abnormality or malfunction in torque values, and performs torque control according to the comparison result. If abnormality occurs in torque values, the electric vehicle runs with limited torque values not exceeding a predetermined value.

Figure 7:
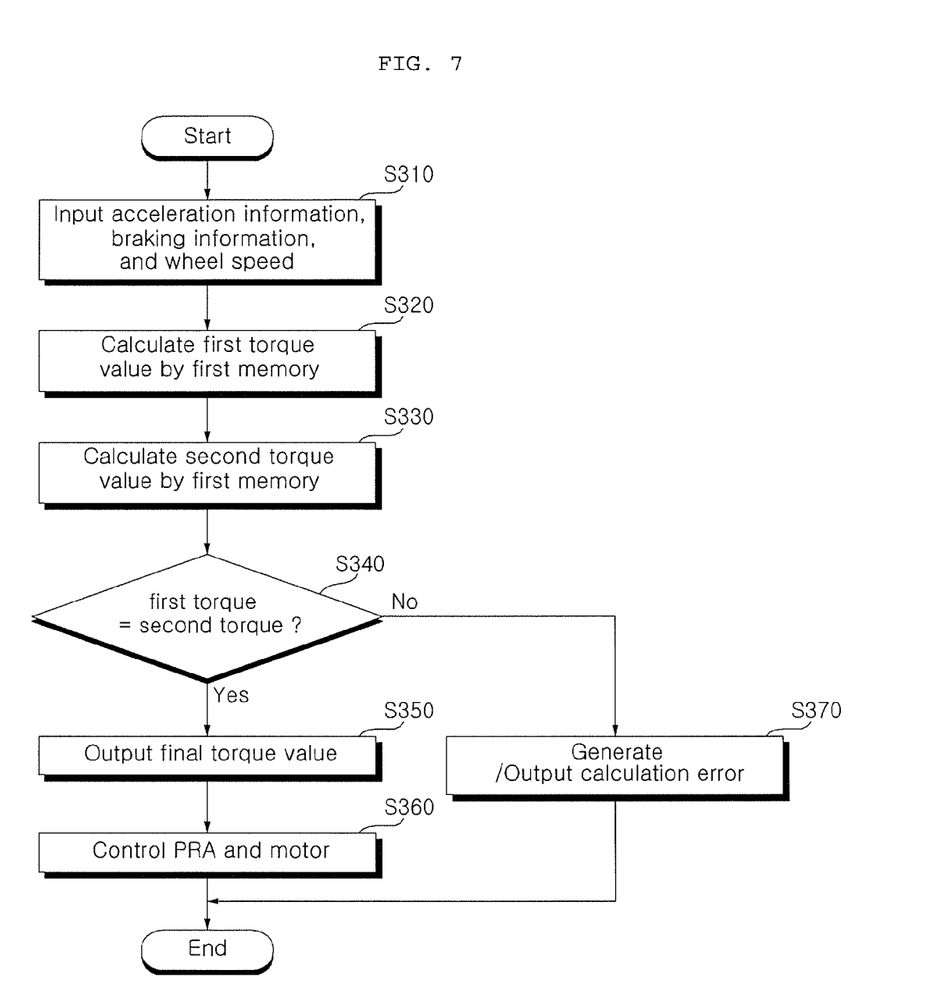
FIG. 7 is a flowchart illustrating a method for controlling the electric vehicle according to an embodiment of the present invention.

FIG. 7 is a flowchart illustrating a method for controlling the electric vehicle according to an embodiment of the present invention.

Referring to FIG. 7, a variety of input values for torque calculation (for example, acceleration information, braking information, a wheel speed, etc.) are input to the MCU 120 in step S310. Acceleration information of the accelerator and braking information of the brake are input to the MCU through the interface unit 180, and a wheel speed detected by the wheel sensor is transmitted from the VCM 110 to the MCU 120. In addition, the remaining battery charge and the battery voltage measured by the BMS 180, a vehicle slope detected by the slope sensor of the sensor unit 140, and a torque control value for activating an economy (ECO) mode or an electronic stability control (ESC) may be transmitted from the VCM 110 to the MCU 120.

The MCU 120 calculates the first torque value for the first memory 121 using input values in step S320. In more detail, the MCU 120 calculates a first torque value for use in the first memory 121 having a specific memory address using input values such as acceleration information, brake information, wheel speed, etc.

The MCU 120 calculates the second torque value for use in the second memory 122 using input values in step S330. The MCU 120 calculates a second torque value for use in the second memory 122 having a specific memory address using input values such as acceleration information, brake information, wheel speed, etc.

The second torque value is calculated using the same input values and the same logic units at the same time as that of the first torque value. Step S320 and Step S330 can be performed at the same time or different times. If Step S320 and Step S330 are performed at different times, they are performed using the same input values obtained from the same time.

The comparator 123 compares the first torque value is identical with the second torque value in step S340, such that it can determine whether the first torque value calculated by the first memory 121 is identical to the second torque value calculated by the second memory 122.

If the first torque value is identical to the second torque value, the comparator 125 outputs the final torque value in step S350. The comparator outputs the final torque value (i.e., the first and second torque values identical to each other) to the VCM 110, the motor 130 or the PRA 150.

The PRA 150 and/or the motor 130 are controlled in a manner that the motor 130 can generate the final torque value in step S360. The PRA 150 controls the operating power of a high voltage supplied from the battery 160 in such a manner that the motor 130 can generate the final torque value, and provides the resultant operating power to the MCU 120 or cuts off the same.

If the first torque value is different from the second torque value, the comparator 123 outputs a calculation error signal in step S370. The comparator 123 outputs the calculation error signal to the MCU 110 when the first torque is different from the second torque value, such that the output unit of the interface unit 180 outputs the calculation error signal to the outside and the motor 130 does not generate a torque based on the calculated first and second torque values.

Figure 8:
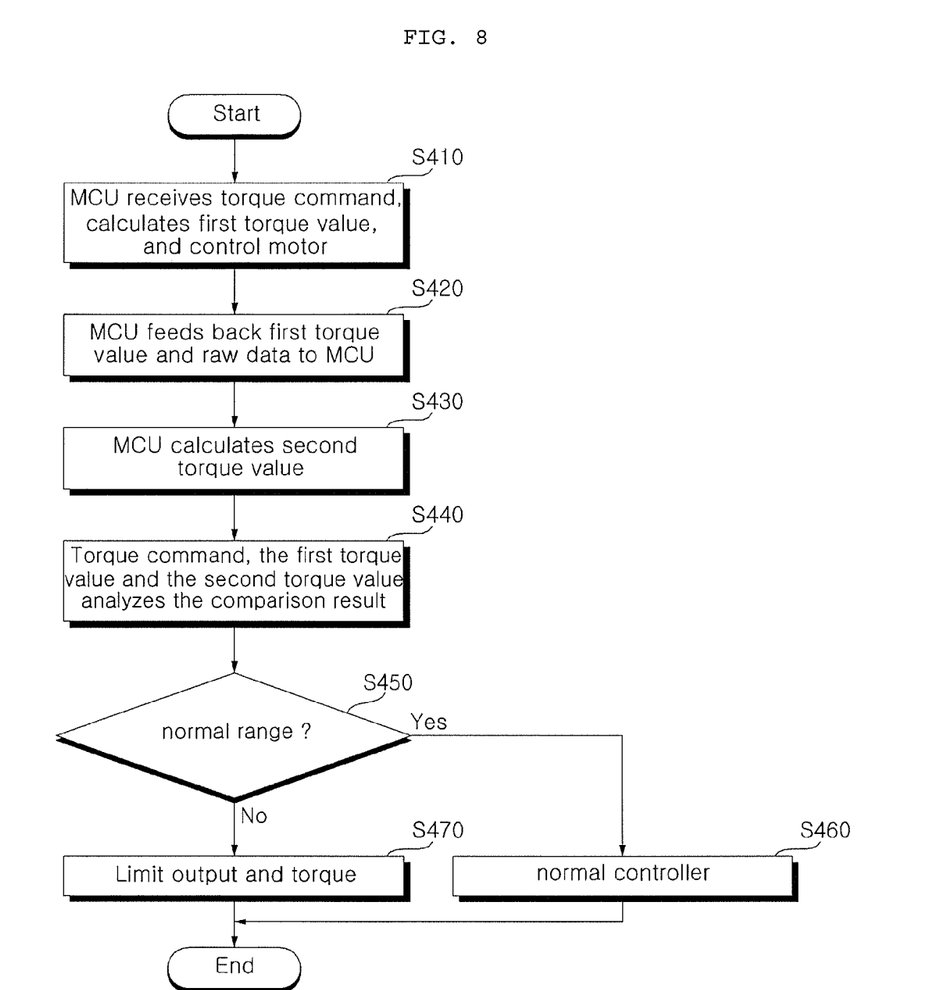
FIG. 8 is a flowchart illustrating a method for controlling the electric vehicle according to an embodiment of the present invention.

FIG. 8 is a flowchart illustrating a method for controlling the electric vehicle according to an embodiment of the present invention.

Referring to FIG. 8, the VCM 110 generates a torque value to control vehicle traveling on the basis of input signals, and outputs the torque command to the MCU 120. In this case, the MCU 120 calculates the first torque value upon receiving the torque command from the MCU 110, and controls the motor 130 in step S410.

The MCU 120 feeds back not only the calculated first torque value but also raw data related to the first torque value to the MCU 110 in step S420.

The VCM 110 calculates a second torque value upon receiving the raw data from the MCU 120 in step S430.

The second torque value can be calculated using the following equation 1.

$$\begin{bmatrix} i_{dse} \\ i_{qse} \end{bmatrix} = \frac{2}{3} \begin{bmatrix} \cos\theta & \sin\theta \\ -\sin\theta & \cos\theta \end{bmatrix} \begin{bmatrix} 1 - \frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ i_w \end{bmatrix} \quad \text{[Equation 1]}$$

In Equation 1, $i_u$ is a U-phase current value applied to the motor 130, $i_v$ is a V-phase current value applied to the motor 130, $i_w$ is a W-phase current value applied to the motor 130, and θ is a rotor angle.

The calculation resultant values derived from Equation 1 include a current ($i_{des}$) of a d-axis rotation coordinate system and a current ($i_{qse}$) of a q-axis rotation coordinate system.

$$T_{vcm\text{-}cal} = \frac{i_{dse} \cdot T_{rate}}{i_{rate}} \quad \text{[Equation 2]}$$

In Equation 2, $i_{qse}$ is a q-axis rotation coordinate system current calculated by Equation 1, $T_{rate}$ is the rated torque of the motor 130, and $i_{rate}$ is a current at the rated torque.

$T_{vcm\text{-}cal}$ is a second torque value calculated by the VCM 110.

The VCM 110 performs comparison among the torque command, the first torque value received from the MCU 120, and the second torque value calculated using raw data, and analyzes the comparison result in step S440.

When the VCM 110 compares the torque command sent therefrom with a second torque value calculated using raw data, there is a delay time between the transmission time and the reception time, such that it is impossible for the VCM 110 to perform correct comparison. In order to solve the above problem, the VCM 110 assigns a torque ID to the torque command, and transmits the resultant torque command. In addition, when the MCU 110 feeds back the raw data to the MCU, the MCU 110 assigns the same torque ID as a torque ID assigned to the torque command to the raw data, and feeds back the resultant raw data. The MCU 110 compares the torque command with the second torque value calculated using raw data to which the same torque ID is allocated, such that there is no time delay between the transmission time and the reception time and the MCU 110 can perform correct comparison without any time delay.

It is determined whether the MCU 120 operates within the normal range in step S450.

If the MCU 120 is in a normal state, the MCU 120 normally operates without limitation in output and torque in step S460. Unless the MCU 120 is in the normal state, the electric vehicle does not stop and is driven within the limited range of the output and torque of the motor 130 in step S470. In this case, the limited range may have the output range of 35 kW~45 kW and the torque range of 110 Nm~120 Nm.

Figure 9:
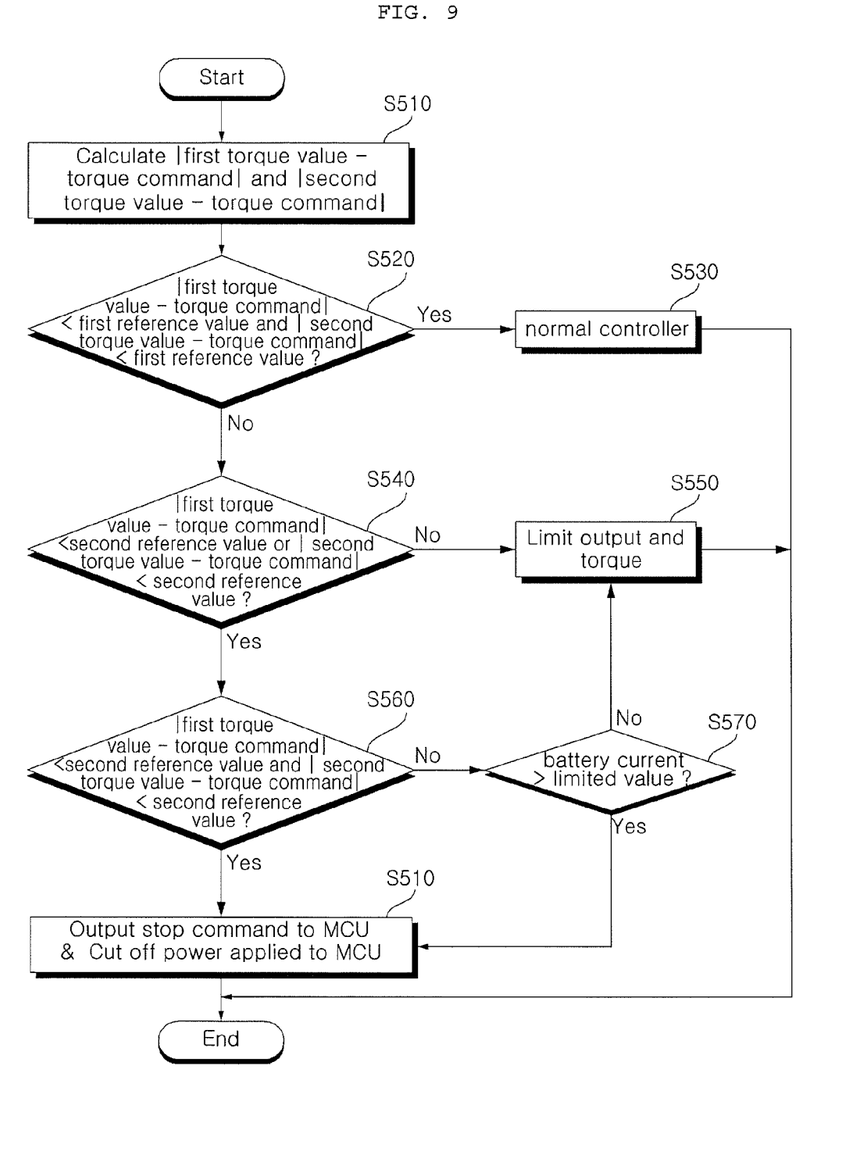
FIG. 9 is a flowchart illustrating a method for controlling vehicle traveling on the basis of a state of the electric vehicle according to an embodiment of the present invention.

FIG. 9 is a flowchart illustrating a method for controlling vehicle traveling on the basis of a state of the electric vehicle according to an embodiment of the present invention.

Referring to FIG. 9, the VCM 110 calculates a difference between a torque command and a first torque value, and a difference between a torque command and a second torque value in step S510.

The VCM 110 determines whether each of the difference between the torque command and the first torque value and the difference between the torque command and the second torque value is higher than a first reference value in step S520.

In this case, the first reference value may be established within the range of 55 Nm~65 Nm.

If at least one of the difference between the torque command and the first torque value and the difference between the torque command and the second torque value is not higher than the first reference value, the VCM 110 determines a normal state of the MCU 120 and controls the motor 130 to normally operate without limitation in output and torque of the motor 130 in step S530.

If each of the difference between the torque command and the first torque value and the difference between the torque command and the second torque value is higher than the first reference value, the VCM 110 determines whether at least one of the difference between the torque command and the first torque value and the difference between the torque command and the second torque value is higher than the second reference value higher than the first reference value in step S540.

Preferably, the second reference value may be established within the range of 110 Nm~120 Nm.

If each of the difference between the torque command and the first torque value and the difference between the torque command and the second torque value is not higher than the second reference value, the VCM 110 does not stop the electric vehicle and controls the electric vehicle to operate within the limited range of the output and torque of the motor 130 in step S550.

As described above, the limited range may have the output range of 35 kW~45 kW and the torque range of 110 Nm~120 Nm.

If at least one of the difference between the torque command and the first torque value and the difference between the torque command and the second torque value is higher than a second reference value, the VCM 110 determines whether each of the difference between the torque command and the first torque value and the difference between the torque command and the second torque value is higher than a second reference value in step S560.

If any one of the difference between the torque command and the first torque value and the difference between the torque command and the second torque value is not higher than the second reference value, the VCM 110 determines whether the output current of the battery 160 is higher than a predetermined limit value in step S570. In this case, if the output current of the battery 160 is not higher than the limit value, the VCM 110 does not stop the electric vehicle and establishes the limited output and torque values of the motor 130, such that it controls the electric vehicle to be driven within the limited range in step S550. In this case, if the output current of the battery 160 is higher than the limit value, the VCM 110 transmits a stop command to the MCU 120 and cuts off power supplied from the battery 160 to the MCU 120 in step S580.

In this case, the limited output current of the battery 160 may be established within the range of 125 A~135 A. If the output and torque of the motor 130 are limited, the output current of the battery 160 is generally reduced. Although the output and torque of the motor 130 are limited, if the output current of the battery 160 exceeds the limited output current, the VCM 110 determines the occurrence of abnormality in the MCU 120 and stops the electric vehicle.

If each of the difference between the torque command and the first torque value and the difference between the torque command and the second torque value is higher than the second reference value, the VCM 110 transmits a stop command to the MCU 120 and cuts off power supplied from the battery 160 to the MCU 120 in step SS580.

Therefore, the electric vehicle and a method for controlling the same according to embodiments of the present invention, under the condition that unexpected problems such as internal calculation errors of the MCU occur so that the first torque value is correctly output but there arises abnormality in the torque value actually applied to the motor, compares the second torque value calculated by the VCM with the torque command on the basis of the raw data actually applied to the motor, such that the presence or absence of abnormality in the MCU is determined and vehicle traveling can be controlled according to the determined result.

Figure 10:
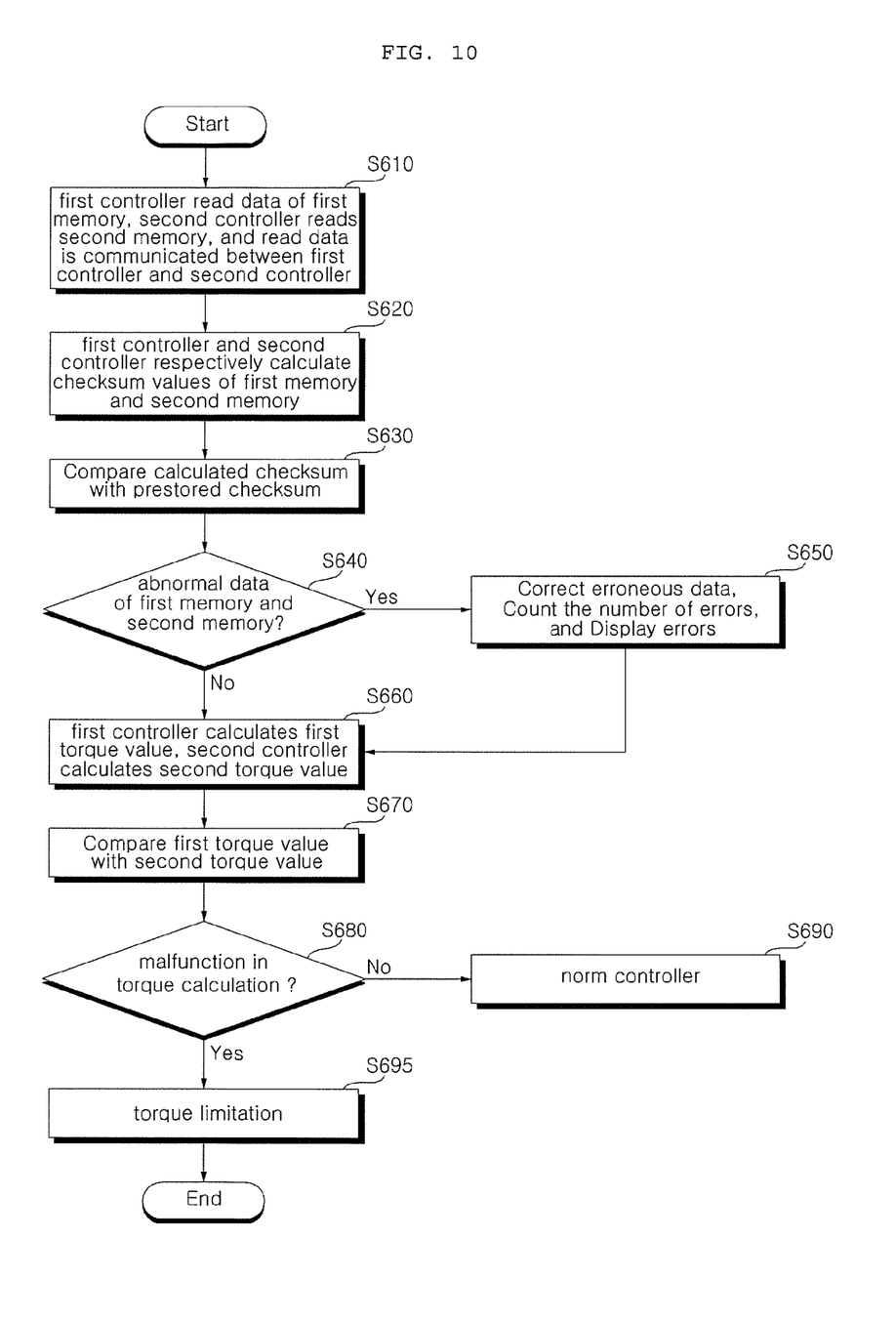
FIG. 10 is a flowchart illustrating a method for controlling the electric vehicle according to an embodiment of the present invention.

FIG. 10 is a flowchart illustrating a method for controlling the electric vehicle according to an embodiment of the present invention.

Referring to FIG. 10, the first controller 210 reads data stored in the first memory 215, and the second controller 220 reads data stored in the second memory 225. The first controller 210 and the second controller 220 perform mutual transmission of the read data in step S610.

The first controller 210 calculates a checksum of data stored in the first memory 215 using data read from the first memory 215, and calculates a checksum of data stored in the second memory 225 using the output data of the second controller 220. Likewise, the second controller 220 calculates a checksum of data stored in the second memory 225 using data read from the second memory 225, and calculates a checksum of data stored in the first memory 215 using the output data of the first controller 210 in step S620.

The first controller 210 compares each of a checksum of data stored in the first memory 215 and a checksum of data stored in the second memory 225 with a checksum prestored in the first controller 210, and determines whether each checksum is identical to the prestored checksum.

The second controller 220 compares each of a checksum of data stored in the first memory 215 and a checksum of data stored in the second memory 225 with a checksum prestored in the second controller 220, and determines whether each checksum is identical to the prestored checksum in step S630.

The first controller 210 and the second controller 220 are configured to determine whether abnormality occurs in data stored in the first memory 215 and the second memory 225 on the basis of the above comparison result in step S640.

If the abnormal data occurs, each of the first controller 210 and the second controller 220 corrects abnormal data, counts the number of occurrences of such abnormal data, outputs at least one of warning sound, a warning lamp and a warning message, and displays an abnormal state in step S650. However, the first controller 210 and the second controller 220 display the abnormal state but maintain vehicle driving.

In order to correct the abnormal data, the previous or next data of the abnormal data is used for such data correction as described above. The first controller 210 and the second controller 220 may perform such data correction using an average value of the previous and next data of the abnormal data according to the linear interpolation method.

In this case, if the number of occurrences of abnormal data is equal to or higher than a predetermined limited number of times, the first controller 210 and the second controller 220 are configured to determine the presence of serious abnormality (or malfunction) in the vehicle, such that the vehicle stops motion.

If data stored in the first memory 215 and the second memory 225 is normal or if abnormal data is corrected and the number of occurrences of abnormal data is not higher than a predetermined limited number of times, the first controller 210 calculates a first torque value using data stored in the first memory 215, and the second controller 220 calculates a second torque value using data stored in the second memory 225 in step S660.

The first controller 210 transmits the calculated first torque value to the second controller 220, and the second controller 220 transmits the calculated second torque value to the first controller 210.

The first controller 210 calculates a checksum of the first torque values calculated for a predetermined time, and compares a checksum of the second torque values received from the second controller 220 with a checksum of the first torque values. In addition, the second controller 220 calculates a checksum of the second torque values calculated for a predetermined time, and compares a checksum of the first torque values received from the first controller 210 with a checksum of the second torque values in step S670.

If a difference between the checksum of the first torque values and the checksum of the second torque values is equal to or higher than a predetermined value, the first controller 210 and the second controller 220 determine the presence of abnormality in torque calculation in step S680.

If the difference between the checksum of the first torque vales and the checksum of the second torque values is less than the predetermined value, torque calculation of the first and second controllers 210 and 220 is considered normal, such that the first controller 210 transmits a torque command for torque control to the MCU 230, and controls vehicle driving in step S690. If abnormality occurs in torque values, each torque value is limited not to exceed a predetermined value so that the vehicle runs within the range of limited torque values in step S695. Then the electric vehicle outputs at least one of a warning sound, a warning lamp and a warning message so as to inform a vehicle driver of the abnormal state.

As is apparent from the above description, in accordance with the electric vehicle and the method for controlling the same, the electric vehicle includes a plurality of controllers configured to perform mutual monitoring therebetween, such that it determines the presence or absence of abnormality in torque calculation, resulting in prevention of sudden torque change. In addition, the electric vehicle can recognize whether abnormality occurs in data stored in memories through such monitoring, such that it can correct the abnormal data. As a result, the electric vehicle can be controlled in such a manner that reliability of torque values and stability of the electric vehicle are increased.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method for controlling an electric vehicle comprising:
   calculating via a first controller a first torque value for controlling a motor on the basis of first data stored in a first memory;
   calculating via a second controller a second torque value for controlling the motor on the basis of second data stored in a second memory having a memory address different from that of the first memory;
   determining via the first controller and the second controller abnormality in torque calculation by comparing the first torque value with the second torque value;
   receiving via a motor controller the first torque value and the second torque value from the first controller and the second controller;
   controlling the motor via the motor controller based on one of the first torque value and the second torque value for driving the electric vehicle,
   wherein the first data and the second data are same values for torque calculation.

2. The method according to claim 1,
   wherein the first data and the second data includes at least one of acceleration information of an accelerator, braking information of a brake, a wheel speed, the remaining battery charge, a battery voltage, a vehicle slope, an economy (ECO) mode torque control value, and an electronic stability control (ESC) torque control value.

3. The method according to claim 2, wherein the first torque value and the second torque value are calculated through the same logic on the basis of data obtained at the same time.

4. The method according to claim 1, wherein:
   in the comparing of the first torque value and the second torque value,
   if the first torque value is identical to the second torque value, the first torque value or the second torque value is determined to be a final torque value so that a motor generates the final torque value, and
   if the first torque value is different from the second torque value, a message indicating the presence of abnormality is output to an external part and the motor does not generate torque according to the first torque value and the second torque value.

5. The method according to claim 1, wherein:
   the first data is a torque command that is transmitted from a vehicle control module (VCM) to a motor control unit (MCU), and a motor is controlled in response to the first torque value; and
   the second data is raw data regarding the first torque value that is fed back from the vehicle control module (VCM) to the motor control unit (MCU), and the first torque value, the second torque value and the torque command are compared to determine the presence or absence of abnormality in torque calculation, such that vehicle driving is controlled according to the determined result.

6. The method according to claim 5, wherein:
   in the comparison result, if each of a difference between the torque command and the first torque value and a difference between the torque command and the second torque value is higher than a first reference value, the vehicle control module (VCM) establishes a limited range of output and torque of the motor in such a manner that the vehicle is driven within the limited range.

7. The method according to claim 6, wherein:
if each of a difference between the torque command and the first torque value and a difference between the torque command and the second torque value is higher than a second reference value higher than the first reference value, the vehicle control module (VCM) transmits a stop command to the motor control unit (MCU) and cuts off power applied from a battery to the motor control unit (MCU); and
if any one of a difference between the torque command and the first torque value and a difference between the torque command and the second torque value is higher than the second reference value, a battery output value is compared with a predetermined limit value, and if the battery output current is higher than the limit value, the vehicle control module (VCM) outputs a stop command to the motor control unit (MCU) and cuts off power applied from a battery to the motor control unit (MCU).

8. An electric vehicle comprising:
a motor that generates torque for driving the electric vehicle; and
a motor control unit (MCU) that calculates a torque value for controlling the motor,
wherein the motor control unit (MCU) includes:
a first memory having a specific memory address; and
a second memory having a specific memory address different from that of the first memory,
whereby the motor control unit (MCU) calculates a first torque value on the basis of data stored in the first memory, and calculates a second torque value on the basis of data stored in the second memory, and
the motor generates torque on the basis of the first torque value or the second torque value as a final torque value when the first torque value is identical to the second torque value.

9. The electric vehicle according to claim 8, further comprising:
a battery that stores electric energy;
a power relay assembly (PRA) that switches battery power to be supplied to the motor control unit (MCU); and
an interface unit for outputting information of the electric vehicle,
wherein the motor control unit (MCU) controls the power relay assembly (PRA) in such a manner that the motor generates torque corresponding to the final torque value, and if the first torque value is different from the second torque value, the interface unit outputs a calculation error message on a display.

10. An electric vehicle comprising:
a vehicle control module (VCM) that generates a torque command for a motor to control driving of the electric vehicle; and
a motor control unit (MCU) that calculates a first torque value in response to the torque command, and controls a motor on the basis of the first torque value, and transmits the first torque value and raw data regarding the first second torque values torque value to the vehicle control module (VCM),
wherein the vehicle control module (VCM) calculates a second torque value on the basis of the raw data, and determines a current vehicle state by comparing the torque command with the first and second torque values.

11. The electric vehicle according to claim 10, wherein:
if each of a difference between the torque command and the first torque value and a difference between the torque command and the second torque value is higher than a first reference value, the vehicle control module (VCM) establishes a limited range of output and torque of the motor in such a manner that the vehicle is driven within the limited range.

12. The electric vehicle according to claim 11, wherein:
if each of a difference between the torque command and the first torque value and a difference between the torque command and the second torque value is higher than a second reference value higher than the first reference value, the vehicle control module (VCM) transmits a stop command to the motor control unit (MCU) and stops the vehicle; and
assuming that any one of a difference between the torque command and the first torque value and a difference between the torque command and the second torque value is higher than the second reference value, if a battery output current is higher than a predetermined limit value, the vehicle control module (VCM) outputs a stop command to the motor control unit (MCU) and stops the vehicle, and if the battery output current is equal to or less than the predetermined limit value, the vehicle control module (VCM) does not stop the vehicle so that the vehicle is driven within the limited range.

13. The electric vehicle according to claim 10, wherein the motor control unit (MCU) feeds back row data including at least one of an input current of the motor, a rotor angle of the motor, and a rated torque of the motor, and includes a sensor unit comprised of a plurality of sensors configured to measure the input current of the motor and the rotor angle of the motor.

14. An electric vehicle comprising:
a first memory that stores a first data of the electric vehicle;
a second memory that stores a second data of the electric vehicle;
a first controller that calculates a first torque value on the basis of the first data for controlling the electric vehicle;
a second controller that calculates a second torque value on the basis of the second data for controlling the vehicle and
a motor controller that controls a motor according to the first torque value or the second torque value for driving the electric vehicle,
wherein the first controller compares the first torque value with the second torque value received from the second controller and determines malfunction in the first torque value,
a second controller compares the second torque value with the first torque value received from the first controller and determines malfunction in the second torque value, and
the first data and the second data are same values for torque calculation.

15. The electric vehicle according to claim 14, wherein:
the first data and the second data includes at least one of acceleration information of an accelerator, braking information of a brake, a wheel speed, the remaining battery charge, a battery voltage, a vehicle slope, an economy (ECO) mode torque control value, and an electronic stability control (ESC) toque control value.

16. The electric vehicle according to claim 14, further comprising:
interface unit having input unit and output unit,
wherein:
if the first torque value is identical to the first torque value, the motor controller controls the motor according to the first torque value or the second torque value as a final torque value, and
if the first torque value is different from the second torque value, the output unit outputs an error message indicating malfunction, the motor controller prevents the motor from generating torque according to the first torque value and the second torque value, and the motor controller controls the motor with limited torque value.

* * * * *